United States Patent

[11] 3,620,842

| [72] | Inventors | Felix J. Germino<br>Palos Park;<br>Francis E. Kite, Riverside; Edwin H.<br>Christensen, La Grange, Park, all of Ill. |
|---|---|---|
| [21] | Appl. No. | 668,397 |
| [22] | Filed | Sept. 18, 1967 |
| [45] | Patented | Nov. 16, 1971 |
| [73] | Assignee | CPC International Inc.<br>New York, N.Y. |

[54] TEXTURIZING STARCH
13 Claims, 1 Drawing Fig.

[52] U.S. Cl. .................................................. 127/32,
99/139, 99/144, 127/70
[51] Int. Cl. ........................................... C13l 1/08
[50] Field of Search .......................................... 127/32, 38,
70; 260/233.3, 233 A

[56] References Cited
UNITED STATES PATENTS

| 2,254,867 | 9/1941 | Bonotto .......................... | 34/8 |
| 2,386,509 | 10/1945 | Schoch ........................... | 127/32 |
| 3,137,592 | 6/1964 | Protzman ....................... | 127/32 X |
| 3,485,668 | 12/1969 | Kunze ............................. | 127/32 X |

OTHER REFERENCES

Hugh J. Roberts, " Starch: Chemistry and Technology," R. L. Whistler, ed., Vol. I, 441– 442, Academic Press, New York, 1965.

Primary Examiner—Morris O. Wolk
Assistant Examiner—Sidney Marantz
Attorneys—Frank E. Robbins, James L. Bailey, Janet E. Price, Robert D. Weist and Martha A. Michaels ABSTRACT: Method for preparing a starch having texturizing properties from ungelatinized starch which involves mixing ungelatinized starch with a liquid medium, the liquid medium containing 30 to 65 percent of a starch solvent and 70 to 35 percent of an organic liquid. The mixture is then reacted at a temperature between 240° and 380° F. for a period of time sufficient to substantially completely disrupt the starch granules. The starch is then removed from the liquid phase. The resulting product is cold-water-swellable, nonbirefringent, substantially completely fragmented starch. When slurried in water at a solids content of as little as 5 percent, the product exhibits texturizing characteristics by yielding a pulpy mixture. The product is particularly suitable for use in food products such as applesauce, spaghetti sauce and the like.

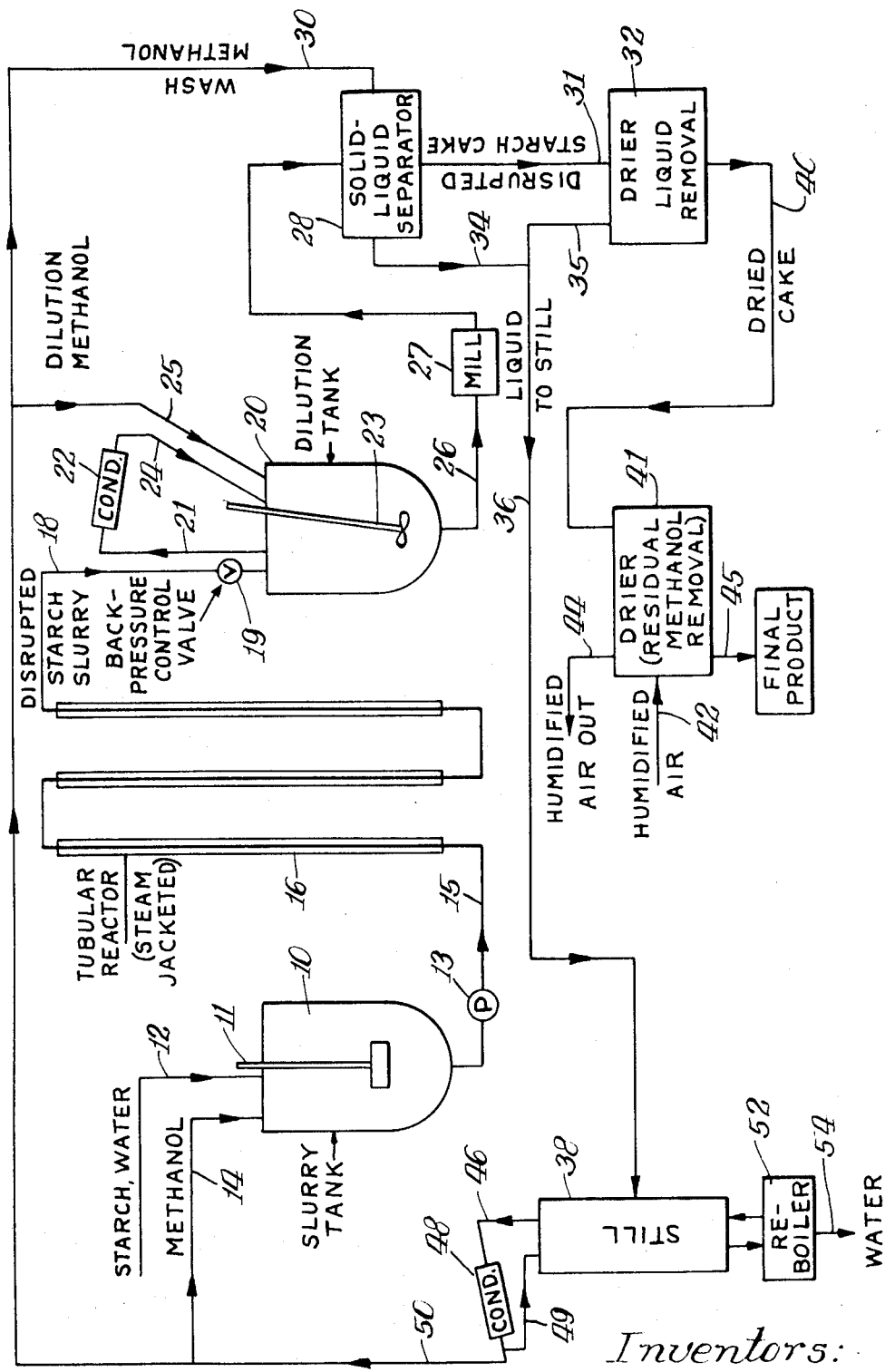

TEXTURIZING STARCH

This invention relates to a method for preparing a gelatinized starch which exhibits a texturizing power, thickening power, is completely nonbirefringent, and is cold-water-swellable.

Pregelatinized starch is conventionally prepared by roll-drying or spray-drying a gelatinized starch paste. Although this dried product is cold-water-swellable, forms a smooth paste, and exhibits thickening power when dispersed in water, it rapidly loses viscosity when subjected to shear and it lends no texture to the paste.

It is an object of the present invention to provide a gelatinized starch which is cold-water-swellable, exhibits thickening power, and provides a coarse pulpy texture when admixed with water.

A further object is to prepare a starch which will readily disperse in water to form a viscous, pulpy paste, the viscosity of which increases when subjected to shear.

It is still a further object to develop a simple, economical and commercially feasible process for the preparation of cold-water-swelling starch which when dispersed in water forms a viscous pulpy paste.

A more specific object is to prepare a cold-water-swelling starch which is characterized by substantially complete granule fragmentation, thickening power in a water medium, acid stability, thermal stability, nonbirefringence, and which exhibits a pulpy texture upon being admixed with water.

Another object is to provide a process for preparing a gelatinized texturized starch which when dispersed in water yields a pulpy paste having excellent "mouthing" properties as exhibited by the complete absence of grainy, gritty or sandy characteristics.

Other objects and advantages will be apparent from the description and appended claims which follow.

The single FIGURE of drawing is a schematic diagram of an apparatus that can be used for the practice of one preferred embodiment of a continuous process for treating starch material, in accordance with the present invention.

The instant invention is directed to a process for controlled gelatinization of ungelatinized starch to permit recovery of a starch product which is substantially completely gelatinized (i.e., fragmented or disrupted). The starch so produced is cold-water-swellable, nonbirefringent, and upon X-ray analysis at least about 10 percent of the starch product exhibits a helical structure.

Starches treated in accordance with the invention have many uses; for example, as thickening agents in foodstuffs, and adhesives as well as for the preparation of paper coatings, sizings, or the like.

Briefly, the process may be carried out as follows. Ungelatinized starch is mixed with a liquid medium in a proportion such that the starch is present in an amount less than 35 percent by weight. The liquid medium contains a starch solvent such as water and an organic liquid such as methanol. The mixture is placed in a confined zone and heated to a temperature between 240° and 380° F. for a period of time sufficient to substantially completely disrupt the starch granules. The specific conditions of time of treatment, temperature of treatment, and proportions of the ingredients in the slurry are so selected as to insure substantially complete granule fragmentation and so as to obtain a starch exhibiting pulpy characteristics. The proper selection of these conditions will be discussed fully hereinafter.

By the term "starch solvent" is meant any liquid in which starch will dissolve or gelatinize. The most commonly used and most economical solvent for starch is water which is the preferred solvent in the present invention. Other common solvents, however, such as dimethyl sulfoxide, dimethyl formamide, N-methyl pyrrolidone or 2-amino ethanol are just as suitable although less economical in the practice of the present invention. In the following discussion and throughout the specification and claims, this liquid will be referred to as the "solvent."

The second liquid component of the reaction mixture can be any organic liquid which is miscible with the solvent for starch, which is itself not a solvent for starch and which is hydrophilic. If the starch is to be used as an ingredient in food, then substantially all of the organic liquid must be removed from the starch after treatment. For this reason, it may be desirable to use a liquid which is not excessively retainable within the starch granules. For economic reasons, it is desirable to select a liquid which can be readily recovered from the solvent for reuse. Suitable organic liquids include lower alcohols, such as methanol, ethanol, isopropanol, tertiary butanol; ketones such as acetone, methylethyl ketone; dioxane; and the like. In the following discussion and in the claims this component will be referred to as "organic liquid."

The invention can be carried out using any ungelatinized starch or starch fraction, starch derivatives or modified starches. The basic requirement for selecting the starch is that the starch or starch fraction be ungelatinized. In addition, other characteristics may be built into the final product by modification of the starch prior to treatment in accordance with the invention. For example, crossbonding of the ungelatinized starch will render the final product substantially acid stable and thermal stable, and acid modification reduces viscosity and increases setback or gelling capabilities.

The liquid medium generally contains about 30 percent to about 65 percent of the starch solvent, such as water, and about 70 percent to about 35 percent of the organic liquid, such as methanol. Preferably, the starch solvent will be present in an amount between about 40 percent and about 60 percent of the liquid medium, and most preferably, between about 45 percent and about 55 percent.

The starch is present in the reaction mixture in an amount less than about 35 percent, preferably, about 20 percent to about 30 percent. Lesser proportions of starch may be used, but are less economical.

The slurry is preferably placed in a confined zone and heated to a temperature between about 240° and about 380° F. The preferred temperature is 260° to 310° F. and the most preferred about 280° to about 300° F. The retention time at the elevated temperature is interdependent with and inversely proportional to the temperature at which the reaction is being carried out. The time may be as short as 1 minute and as long as 60 minutes, or under low-temperature reaction conditions the reaction may go an unlimited amount of time without deleterious effects upon the final product. The basic premise for establishing the optimum reaction time is to continue the reaction until substantially all granules are completely disrupted or fragmentized thereby exhibiting substantially 100 percent gelatinization. It is also desirable to maintain the reaction under sufficient pressure to prevent vaporization of the liquid medium. In this manner, reaction time may be kept to a minimum and substantially complete recovery of the liquid medium constituents is easily achieved.

The process may be continuous or batch and can be carried out in a variety of apparatuses such as tubular converters, heat exchangers, conventional starch heaters and the like.

After treatment the starch is recovered from the liquid phase of the slurry by filtration, centrifugation or the like. With most of the liquid systems it is desirable to add excess organic liquid to the slurry prior to separation of the starch from the liquid medium, thereby reducing the proportion of the overall solvent content. This step is particularly advantageous, when water is used as the solvent, for the following reasons: (1) it greatly facilitates filtration of the starch from the slurry, and (2) unless the water content is reduced before application of heat upon drying, an unacceptable horny product may be obtained which does not rapidly swell or hydrate in water.

The final product which swells and hydrates in water, of course, should not be washed with the starch solvent, but can be washed with the organic liquid. If the starch is to be used in food products and the organic liquid is inedible, then substantially all of the organic liquid must be removed from the treated starch. Any process which will effectively remove the liquid without adversely affecting the starch can be employed.

As can be seen from the above discussion, the essence of the invention is the discovery that, by disrupting or fragmenting a starch material in the previously described liquid medium the process can be so controlled as to permit preparation of a product having the outstanding characteristics of providing a pulpy texture to aqueous systems in which the starch is used in amounts of at least about 5 percent.

Products having this characteristic are truly "cold-water-swelling" and are far superior to the previously known "cold-water-swelling" or "pregelatinized" starches in the following characteristics:

1. unlike prior art products, they rapidly and completely hydrate in water to form uniform, viscous pastes having a pulpy texture but without formation of lumps or clots;
2. the resultant pulpy pastes are more viscous at a given solids content than those pastes obtained from prior art products at the same solids level;
3. pastes formed from prior art products decrease in viscosity when subjected to shear, while those formed at the same solids level from the products of the invention increase in viscosity when subjected to shear;
4. the pastes are extremely bland in flavor, and have no "-grainy," "gritty," or "sandy" "mouthing" characteristics.

In addition, the products of the invention when subjected to X-ray diffraction analysis exhibit a crystalline structure pattern characteristic of the helical or "V-form." In order to determine whether or not an actual V-form type starch is present, it is estimated at least about 10 percent of the starch particles must be in the V-form. The products discussed and described hereafter generally contain at least about 50 percent of the starch particles in V-form and may show under analysis that as much as 75 percent or more of the starch particles are in V-form.

Furthermore, X-ray analysis of these products has shown a crystalline structure having d-spacings in the range of 4.25 to 4.42 A. In addition to this range, the products generally show further d-spacings in the ranges of 6.5 to 6.8 A. and 11.3 to 12.0 A.

Although the invention is not limited thereto, it has also been discovered that if the starch is wet milled in the presence of excess organic liquid prior to separation from the liquid medium, the water bound in the starch granules is more available for removal as a result of the reduction in size of agglomerated particles. It is generally desirable to add sufficient excess organic liquid to reduce the proportion of starch solvent to less than 15 percent by weight of the total starch-liquid mixture.

In a typical example of the present invention, corn starch is slurried in a liquid medium containing 45 percent methanol and 55 percent water. The slurry is heated to a temperature of 290° F. for about 2 minutes in a confined zone wherein sufficient pressure is maintained to prevent vaporization of the liquid phase. Upon discharge from the reaction zone, methanol is added to an amount equal to or greater than the weight of the slurry, and the diluted mixture is wet milled so that at least about 80 percent of the material will pass a 20 mesh screen U.S. Sieve Series. After grinding, the reaction mixture is centrifuged to remove most of the liquid medium whereby the water content of the treated starch is reduced to about 6-7 percent. The solid material is then washed with additional methanol, dried to about 3 percent moisture, and steam stripped to effect removal of substantially all of the organic liquid. The final product contains less than 10 parts per million methanol, is sized between −30 and +120 mesh and contains 8-12 percent moisture.

The proper treatment conditions are dependent upon the particular starch being treated. These conditions can readily be ascertained. The following discussion and examples will guide those skilled in the art in selecting the conditions necessary for any particular system and product. In the discussion and examples, extensive data on the preferred system shall be set forth. The preferred system is starch, water and methanol When water is used as a solvent for starch, heat, of course, is necessary for the gelatinization. When using methanol, which is preferred for reasons of economy, along with water for the treatment of corn starch, the following conditions should be employed. In order to obtain a desirable product, the liquid phase of the slurry should contain from 30 percent to 75 percent water and from 70 to 25 percent methanol, preferably 70 percent to 35 percent methanol. Under some treatment conditions at 25–35 percent methanol, the starch may be discolored during treatment although the texturizing properties of the final product are satisfactory. The total slurry should preferably contain less than 40 percent starch by weight and most preferably 20 percent to 30 percent or less starch by weight. Although the process is operable if small quantities of starch are used, it is uneconomical. If much more than 35 percent starch is present, the slurry is difficult to handle.

The time of treatment is extremely short, about 60 minutes being the desired maximum and shorter times, of course, being preferred, the most preferred time being less than 15 minutes and in fact being between about 1 and about 5 minutes. The temperature of the treatment should be within the range of about 240° F. and about 380° F. and is dependent upon the ratio of methanol to water in the liquid phase. The higher the ratio, the higher the temperature required. To illustrate, if the liquid phase comprises 70 percent methanol and 30 percent water, the temperature should be approaching the upper limit. If the liquid phase comprises 35 percent methanol and 65 percent water the temperature should be near the lower limit of 240° F.

The particular process conditions for other solvent and organic liquid systems will depend upon the type of starch being processed, the solvent used, and the organic liquid used. In the examples, suitable conditions for various systems shall be set forth, and persons skilled in the art will readily be able to determine from these guidelines suitable conditions for any other desired system.

The process of the invention can be performed in any apparatus which will permit good temperature control and which will allow maintenance of the liquid phase of the slurry in liquid form throughout the treatment. It can be performed for example in any type of closed vessel at atmospheric or higher pressure, or in a continuous heat exchanger such as a Votator, etc.

A preferred type of apparatus which permits the process to be performed in a rapid continuous and highly efficient manner is a jacketed tubular reactor. The reactor comprises at least one tube which receives the reactants and is equipped with an outer jacket through which a heating medium such as hot water, hot oil, steam, or superheated steam is passed.

Referring now in detail to the drawing by numerals of reference, the numeral 10 denotes a tank that is equipped with a mixer 11 for making up a slurry. A supply line 12 is disposed to discharge a starch-water slurry into the tank 10. A supply line 14 is disposed to discharge methanol into the tank 10. Obviously, these supply lines can be used to feed other materials into the slurry tank, and specific materials are mentioned only to facilitate a description of one preferred embodiment of the process of the invention. Moreover, since the process is intended to be a continuous process, ordinarily a plurality of slurry tanks would be mounted in parallel to permit alternate use and continuous discharge of slurry from at least one of the tanks.

The slurry tank 10 is connected to a pump 13 that discharges through a line 15 into one end of a steam jacket at tubular reactor 16. The internal diameter of the heat-exchange tube and the velocity at which the slurry is pumped through it are selected preferably so as to cause turbulent flow for optimum heat-exchange efficiency. This tubular reactor discharges through a line 18 that is provided with a control valve 19 into a receiving or dilution tank 20. The tank 20 is equipped with a mixer 23.

The tank 20 is also equipped with a superposed reflux condenser. This includes a vapor uptake line 21 and a condenser 22, and a liquid return line 24 that drains the condenser back into the tank 20. A methanol supply line 25 is disposed to feed methanol into the tank 20.

A discharge line 26 interconnects the lower end of the dilution tank 20 with a mill wherein the entire slurry is milled to substantially reduce particle size. The discharge end of the wet mill is interconnected with a solid-liquid separator 28. This separator may be, for example, a filter, centrifuge, or the like. In practice, several items of separating equipment might be mounted in parallel to permit continuous operation. A methanol supply line 30 is connected to the separator 28 to permit washing the separated solid material with methanol, if desired.

From the separator 28 the solid cake is transferred, as is indicated in the drawing by the line 31, to a drier 32. Any suitable form of drying apparatus may be employed. The preferred ways of drying are by contact of the starch material with hot, humid air or with live steam in a tray drier or in a fluidized bed, or the like.

The liquid material from the filter or other separator 28 is withdrawn through a line 34. The methanol that is removed in the drier 32 is condensed and the condensate is passed through a line 35 into a line 36 that feeds a still 38.

The dried cake from the drier 32 is utilized for nonfood uses. If food use is desired, the dried cake from drier 32 is transferred, as is indicated by the line 40 in the drawing, to an ultimate drier 41, in which residual methanol is substantially completely removed. This can be accomplished in any desired manner, but preferably is accomplished by contacting the dried cake with live superheated steam. Alternatively, hot, humidified air can be used as shown in the drawing. The humidified air is supplied to the drier through a line 42 and is discharged from the drier through a line 44. The solid product is removed from the drier, as indicated by the line 45 in the drawing.

The still 38 permits purification, recovery and reuse of the organic liquid within the system, which for economic reasons, is a closed system. A reflux condenser is disposed above the still and includes a vapor line 46, a condenser 48 and a recycle return line 49. The condenser 48 is also connected to a manifold 50 that communicates with the methanol supply lines 14, 25 and 30 respectively to supply fresh methanol to the several points in the process where it is used. A reboiler 52 is disposed beneath the still 38 and water is discharged from the reboiler 52 through a line 54.

The following process, utilizing a tubular reactor, has been found to be particularly efficient. The slurry is made up in a suitable "slurry tank" which is preferably equipped with an agitator. A line in which is positioned a pump, connects the slurry tank to the inlet port of the reactor. The made-up slurry is pumped from the slurry tank into and through the reactor wherein the reaction of the invention takes place. The temperature within the reactor is maintained by means of a suitable heating medium circulated through the outer jacket.

Preferably, the diameter of the tube and the velocity at which the slurry is pumped through the tube are so selected as to cause turbulent rather than laminar flow. Turbulent flow generally results in a more uniform product.

A second line which is positioned a valve for controlling back pressure leads from the outlet port of the reactor into a second tank which we shall refer to as the "dilution tank." The slurry is discharged from the reactor through this second line into the dilution tank. Prior to, or simultaneously with the discharge of the slurry into the dilution tank, additional cold organic liquid is fed into the dilution tank. Preferably the dilution tank is equipped with an agitator which permits the hot slurry to be rapidly and uniformly mixed with and cooled by the additional organic liquid. Dilution may be effected in line in the confined zone or after removal of the treated slurry from the confined zone.

The resulting cooled slurry is then sent to a mill wherein the entire slurry is milled so that the solid particles are reduced in size sufficiently to pass at least a 20 mesh screen. The milled slurry is then sent via discharge line from the milling device to a suitable separation apparatus, e.g., a filter or centrifuge, where the starch solids are recovered from the slurry. The liquid phase is cycled to a suitable separation device, such as a still, wherein the solvent and organic liquid are separated from one another. The recovered starch, e.g., the wet filter cake or centrifuge cake, is then washed and dried.

Alternatively, the starch may be milled after drying; however, the attendant advantage of reducing the agglomerates in size by wet milling is lost.

The dry-treated starch can be used directly for any nonfood purpose. It should be noted, however, that after treatment the starch retains a rather large amount of the organic liquid and is therefore not suitable for use in foodstuffs. It it is desired to use the starch for food purposes, it must be subjected to an additional step whereby the retained organic liquid is removed; this step can be performed by any suitable method and does not constitute a part of the present invention.

The following examples will illustrate the practice of the invention. All percentages are by weight, temperatures in degrees Fahrenheit and time in minutes unless otherwise specified.

EXAMPLE 1

This example illustrates the process conditions for the treatment of corn starch with a water-methanol liquid system.

Crossbonded corn starch having a 15 gram Scott viscosity was slurried with water and methanol at different solids contents and in combination with different water-methanol liquid systems. The slurries were heated for times in the range from 1 to 3.5 minutes. In each case, after the treatment, additional methanol was added to the slurry in an amount of 10 parts of methanol for every 8 parts of slurry. The addition of methanol reduced the water content of the slurry to about 15 percent. The slurry was permitted to cool, after which it was wet milled and filtered. The starch was then washed with methanol and

TABLE 1

| | Percent | | | Reaction | | |
|---|---|---|---|---|---|---|
| | Starch | Methanol | Water | Temperature, °F | Time, minutes | Rating |
| Sample No.: | | | | | | |
| 1 | 25 | 41.25 | 33.75 | 230 | 1.5 | F |
| 2 | 25 | 41.25 | 33.75 | 250 | 1.5 | D |
| 3 | 25 | 41.25 | 33.75 | 270 | 1.5 | B |
| 4 | 25 | 41.25 | 33.75 | 290 | 1.5 | A |
| 5 | 25 | 41.25 | 33.75 | 310 | 1.5 | C |
| 6 | 25 | 41.25 | 33.75 | 330 | 1.5 | E |
| 7 | 25 | 41.25 | 33.75 | 350 | 1.5 | E |
| 8 | 25 | 41.25 | 33.75 | 370 | 1.5 | E |
| 9 | 30 | 31.50 | 38.50 | 240 | 1.5 | D |
| 10 | 30 | 31.50 | 38.50 | 260 | 1.5 | C |
| 11 | 30 | 31.50 | 38.50 | 280 | 1.5 | A |
| 12 | 30 | 31.50 | 38.50 | 300 | 1.5 | A |
| 13 | 30 | 31.50 | 38.50 | 290 | 3.5 | B |
| 14 | 30 | 31.50 | 38.50 | 290 | 2.5 | B |
| 15 | 30 | 31.50 | 38.50 | 290 | 1.5 | A |
| 16 | 30 | 31.50 | 38.50 | 290 | 1 | B |
| 17 | 30 | 31.50 | 38.50 | 290 | 30 | E |
| 18 | 30 | 31.50 | 38.50 | 290 | 15 | D |
| 19 | 10 | 49.5 | 40.5 | 250 | 1.5 | C |
| 20 | 20 | 44.0 | 36.0 | 270 | 1.5 | A | dried. All runs in this example were performed in the continuous tubular reactor previously described.

The product was slurried in water in an amount of about 5 percent and the texture and thickness visually observed. The observations are reported in table 1.

As can be seen from the data in table 1, the principal variables to be considered for a particular starch-solvent-organic liquid system are (1), the relative proportions of solvent and organic liquid in the liquid phase, and (2), the temperature of treatment. These variables are interdependent; the lower the ratio of solvent to organic liquid, the higher the temperature required to produce a specific product.

It will be noted, however, that the temperature and composition of the liquid phase can be adjusted within relatively wide ranges without significant differences in the finished product. Because of this, the process of the present invention is very flexible, easy to control, and therefore readily adaptable to large scale commercial operations.

The samples were all rated according to the following scale:
A. Excellent. Pulpy texture, high stability, resistant to shear, product uniform.
B. Very Good. Pulpy texture, high stability, shear resistant, product uniformity good.
C. Good. Pulpy texture, satisfactory stability, satisfactory shear resistance, product uniformity acceptable.
D. Fair. Pulpy texture, some shear resistance.
E. Pulpy texture, no viscosity.
F. Product unsatisfactory.

EXAMPLE 2

This example illustrates use of other solvents and organic liquids in accordance with the present invention. The procedure and rating scale of example 1 were used.

TABLE 2

| Sample No.: | Percent Starch | Solvent | Organic liquid | Reaction Temperature, °F. | Time, minutes | Rating |
|---|---|---|---|---|---|---|
| 21 | 25 | 33.75 water | 41.25 ethanol | 280 | 1.5 | B |
| 22 | 25 | do | 41.25 acetone | 270 | 1.5 | B |
| 23 | 25 | 37.50 DMSO | 37.50 methanol | 260 | 2-3 | B-C |
| 24 | 25 | 37.50 2-amino ethanol | do | 260 | 2-3 | B-C |

EXAMPLE 3

This example illustrates feasibility of operation over a broad range of solvent-to-organic liquid ratios.
The process steps of example 1 were used.

TABLE 3

| Type of starch | Percent starch | Ratio of methanol to water | Percent methanol | Percent water | Temperature, °F. | Time, minutes | Rating |
|---|---|---|---|---|---|---|---|
| Thick boiling corn | 20 | 70=30 | 56 | 24 | 370 | 1.5 | B |
| Do | 20 | 35=65 | 28 | 52 | 240 | 1.5 | B |
| Cross bonded corn | 20 | 70=30 | 56 | 24 | 380 | 1.5 | B |
| Do | 20 | 35=65 | 28 | 52 | 240 | 1.5 | B |

EXAMPLE 4

Following the procedure of example 1, several different starches were treated to yield texturizing starch products. Results and proportions are in table 4 below.

TABLE 4

| Type of starch | Percent Starch | Percent Methanol | Percent Water | Temperature, °F. | Time, minutes | Rating |
|---|---|---|---|---|---|---|
| Corn starch, unmodified | 25 | 41.25 | 33.75 | 280 | 1.5 | B |
| Red milo starch, unmodified | 25 | 41.25 | 33.75 | 280 | 1.5 | B |
| Corn starch acetate (0.05 DS) | 25 | 41.25 | 33.75 | 280 | 1.5 | B |
| Waxy milo starch phosphate (0.3% bound phosphate) | 25 | 41.25 | 33.75 | 270 | 1.5 | C |
| Cross bonded corn starch | 25 | 41.25 | 33.75 | 290 | 1.5 | A |
| Cross bonded waxy milo starch | 25 | 41.25 | 33.75 | 290 | 1.5 | A |
| Hydroxyethyl milo starch (0.05 DS) | 25 | 41.25 | 33.75 | 280 | 1.5 | D |
| 40-fluidity corn starch | 25 | 41.25 | 33.75 | 280 | 1.5 | B |
| High amylose corn starch | 25 | 33.75 | 41.25 | 340 | 1.5 | B |
| Tapioca starch | 25 | 41.25 | 33.75 | 290 | 2.5 | B |
| Potato starch | 25 | 41.25 | 33.75 | 290 | 2.5 | B |

EXAMPLE 5

In contemplation of use of product in foods, a portion of sample 4 of example 1 was further processed to remove the methanol as follows: The reaction slurry was cooled by the addition of 10 parts of methanol for every 8 parts of reaction mixture. The diluted slurry was then wet milled, filtered, and washed with additional methanol. After the washing with methanol, wet cakes of approximately 60 percent dry substance and containing between 3 percent and 6 percent water were dried in an agitated fluid bed at a temperature of 245° F. The drying was carried out for 1 hour. After 1 hour the moisture level of the starch product was approximately 1 percent. The starch product was then subjected to a steam-stripping treatment for 1 hour with superheated steam at 20 p.s.i.g. through a 1/16-inch orifice with a jacket temperature of 245° F. and a bed temperature of 230° F. After this treatment, the methanol content of the starch product was less than 20 parts per million. This product was thereby satisfactory for food use. The product had the following characteristics:

| | |
|---|---|
| Physical form | White powder |
| paste pH | 5.5–6 |
| Bulk density, pounds per cubic foot, (loose) | 33.5 |
| Bulk density, pounds per cubic foot, (packed) | 40.7 |
| Equilibrium moisture at 25° C. | |
| 30% RH | 6–7% |
| 50% RH | 10–11% |
| 90% RH | 22–23% |
| Caking tendency | None |
| Screen size | |
| U. S. Standard Mesh Size | |
| +30 | 1.2% |
| −30+60 | 47.0% |
| −60+120 | 43.5% |
| −120 | 8.3% |
| Viscosity in Scott | |
| pH 6 | 12g./50 sec. |
| buffered pH 3 | 12g./45 sec. |
| buffered pH 10.3 | 12g./46 sec. |
| Brookfield viscosity 25° C. in a 7.5% aqueous paste (2 hours old) | 7,000 cps. |

In addition, the starch of this example is readily dispersible in both cold and hot water. Although the starch paste, formed when the starch is slurried in water, is coarse in texture, it is free of lumps and clots. The pulpy texture is stable to heat, pH change, and is unaffected by age or additives. The viscosity obtainable is a function of concentration, temperature of preparation, pH and shear.

EXAMPLE 6

Instant Imitation Tomato Sauce

The following ingredients were dry blended: 0.4 gram tomato flavor, 3.5 gram tomato color, 15 grams of texturized starch of example 5, 11.5 grams spices. The dry blend was then mixed with 150 grams of water. The resulting sauce had a pulpy texture and flavor of a natural tomato sauce. The pH of the sauce was 3.5. A portion of the sauce was autoclaved at 240° F. for about 15 minutes. The heated product lost no viscosity nor was the pulpy texture affected; thus acid stability and thermal stability of the texturized starch are clearly demonstrated.

EXAMPLE 7

Imitation Fruit Sauce-Applesauce

Texturizing starch in the amount of 8.7 grams was mixed with 18 grams of sucrose. The dry blend was added to one-third cup of apple juice and mixed. After standing for 10 minutes, the preparation had the pulpy appearance and flavor of natural applesauce. Furthermore, it showed less water loss and color gain on standing than the original natural product of applesauce.

EXAMPLE 8

Synthetic Powdered Applesauce Formulation

A synthetic powdered applesauce can be prepared for marketing using the texturizing starch. An example of this is as follows. To provide the dry mix, the following ingredients were dry blended: 16 grams of texturizing starch, 36 grams of sucrose, 0.5 gram of salt, 3.0 grams of a blend of apple flavor with sucrose, 0.8 gram of citric acid. The consumer would simply add this dry blend to 150 grams of water and mix. The resulting applesauce has the same appearance, flavor and mouth feel of natural applesauce as did example 7. Such dry applications may or may not be vitamin enriched and have utility in storable emergency rations and packaged military uses.

EXAMPLE 9

Fruit Drinks-Natural and Synthetic

Texturizing starch when added in about 2-6 percent by weight of a natural fruit juice provides an instant drink with pulpy appearance but which retains the flavor of the natural fruit drink. The amount used will depend on the preference of the individual and the particular juice. The texturizing starch was used in the above quantity with orange juice, tomato juice, grapefruit juice, cherry juice and cranberry juice. The pulpy characteristic provided by the starch gave the juice a natural juice texture.

A dry blend of texturizing starch and other ingredients may be used to provide a powder which upon addition to water produces an instant drink with the appearance, flavor and mouth feel of the natural drink. The following formulation was developed and on use was added to 120 milliliters of water.

| | |
|---|---|
| Texturizing starch | 7.0 grams |
| Sucrose | 15.0 grams |
| Citric acid | 0.4 grams |
| Synthetic flavor | 8.0 milliliters |

The dry blend can be packaged and sold as a product which can instantaneously be mixed with cold water to provide a delicious fruit drink

EXAMPLE 10

Cheese Dressing-Bleu Cheese

It was found that the addition of texturizing starch to smooth salad dressings simulated the appearance of cheese chunks found in expensive salad dressings. Texturizing starch was added in an amount between 0.5 and 2.5 percent by weight to a smooth commercially available bleu cheese dressing. The result was a bleu cheese dressing having a simulated texture of chunky cheese.

EXAMPLE 11

Fruit Molds

Texturizing starch when combined with a gelling starch can be used to prepare fruit molds having the pulpy appearance of crushed fruit without the use of pulp from the fruit. For example, the following ingredients were admixed: 90.0 grams of apple juice, 25.0 grams of sucrose, 5.0 grams gelling starch, 6.0 grams texturizing starch. The juice was heated to 190° F. with the gelling starch and sugar. Then the texturizing starch was added with stirring. The hot mixture was then poured into the desired fruit mold and allowed to cool. The cooled preparation had the texture, appearance and flavor of crushed apple fruit mold.

EXAMPLE 12

Low-Cost Fruit Pie Fillings

Texturizing starch reduces the cost of fruit pie fillings by replacing a portion of the fruit. There is no change in appearance or taste of the pie.

For example, the following is a conventional formulation for a pineapple pie filling:

| | |
|---|---|
| Water and drained juice | 30.0 parts |
| Sucrose | 10.0 parts |
| Starch | 4.0 parts |
| Corn syrup | 10.0 parts |
| Drained pineapple | 46.0 parts |

A similar formulation utilizing texturizing starch is as follows:

Texturizing Starch Formulation

| | |
|---|---|
| Drained pineapple | 11.0 parts |
| Texturizing starch | 3.5 parts |
| Water | 31.5 parts |
| Imitation flavor | trace |
| | Total 46.0 parts |

The drained pineapple was reduced from 46 parts to 11 parts; however, the texturizing starch formulation exhibited the texture, flavor, and color of the conventional pie filling.

EXAMPLE 13

Pulpy Jellies or Jams for Bakery Goods

The addition of 5 percent texturizing starch to various fruit juices or jellies produces a preparation which is suitable for fillings of bakery goods such as jelly filled cookies, buns, doughnuts, etc. and for the preparation of jams and the like. The texturizing starch not only increases the viscosity of the filling but adds a coarse pulpy texture.

EXAMPLE 14

Instant Gravy

An instant gravy is made using texturizing starch. The gravy is free of lumps but has a pulpy texture. The following formula produced a highly flavorful gravy.

| Hot water | 236 grams |
| Texturizing starch | 12.9 grams |
| Dry beef flavor | 9.9 grams |

In addition to the above, salt, msg., onion powder and coloring were added. The texture, viscosity, flavor and other physical characteristics of the product were very similar to those of a hot brown gravy.

Many other food products and other uses for the texturized starch of the present invention are contemplated. Other uses include paper coatings wherein a particular texture is desired, addition to dye compositions for application to paper, fabric and the like wherein a texturized surface is desired and many other uses.

While the invention has been described in connection with specific embodiments thereof, it will be understood that it is capable of further modifications and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention and the limits of the appended claims.

We claim:
1. A process for treating ungelatinized starch comprising:
   a. mixing ungelatinized starch with a liquid medium, said liquid medium containing about 30 percent to about 75 percent of a starch solvent, selected from the group consisting of water, dimethyl sulfoxide, dimethyl formamide, N-methyl pyrrolidone, and 2-amino ethanol, and about 70 to about 25 percent of a hydrophilic organic liquid, selected from the group consisting of lower alcohols, lower ketones, dioxane, and mixtures thereof, to provide a slurry containing not more than 35 percent starch by weight;
   b. heating the slurry in a confined zone at a temperature between about 240° F. and about 380° F. for a time sufficient to substantially completely disrupt the starch granules; and
   c. recovering the treated starch from the liquid-starch slurry.
2. A process as in claim 1 wherein the liquid medium contains about 40 to about 60 percent starch solvent and about 60 to about 40 percent organic liquid and the starch is present in the slurry in an amount between about 20 and about 30 percent by weight.
3. A process as in claim 1 wherein the temperature is between about 260° F. and about 310° F.
4. The process of claim 1 including the additional step of adding an additional quantity of the organic liquid to the treated slurry prior to recovering the treated starch to proportionally reduce the starch solid to less than 15 percent of the slurry.
5. A process as in claim 4 including a second additional step of grinding the diluted treated slurry so as to yield a slurry wherein at least about 80 percent of the solid material is of a particle size so as to pass through a 20 mesh sieve.
6. A process for treating ungelatinized corn starch comprising:
   a. mixing ungelatinized corn starch with a liquid medium, said liquid medium containing between about 45 and about 55 percent water, and about 55 to about 45 percent methanol to provide a slurry containing between about 20 and about 30 percent corn starch by weight;
   b. heating the slurry in a confined zone at a temperature ranging between about 280° F. and about 300° F. for a time sufficient to substantially completely disrupt the starch granules;
   c. diluting the heated slurry by the addition of methanol in an amount at least equal to the weight of the slurry;
   d. grinding the diluted slurry so as to reduce the particle size of the starch particles sufficiently to pass at least about 30 mesh U.S. Sieve Series;
   e. separating the liquid medium from the starch;
   f. drying the starch to a moisture content less than about 5 percent;
   g. subjecting the dried starch material to a steam process so as to remove the major portion of the residual methanol; and
   h. recovering a treated starch product containing less than 10 parts per million methanol.
7. A process as in claim 6 wherein the starch is crossbonded corn starch.
8. A starch product which is cold-water-swellable, non-birefringent, substantially completely disrupted, which by X-ray diffraction analysis exhibits a helical structure, and which upon slurrying in water in an amount of at least 5 percent by weight provides a paste having a pulpy texture.
9. The starch product of claim 8 wherein at least 50 percent of the product exhibits a helical structure of X-ray diffraction analysis.
10. A starch product in accordance with claim 8 wherein the particles of the product are sufficiently small to pass through a 20 mesh U.S. Sieve Series screen.
11. A starch product which is cold-water-swellable, non-birefringent, substantially completely disrupted, which upon slurrying in water in an amount of at least 5 percent by weight provides a paste having a pulpy texture, and which by X-ray diffraction analysis exhibits a crystalline structure having d-spacings in the range of 4.25 to 4.42 A.
12. The starch product of claim 11 which includes additional d-spacings in the range of 6.5 to 6.8 A.
13. The starch product of claim 12 which includes additional d-spacings in the range of 11.3 to 12.0 A.

* * * * *